United States Patent
Hamano et al.

(10) Patent No.: US 8,289,586 B2
(45) Date of Patent: Oct. 16, 2012

(54) DOCUMENT READING DEVICE AND IMAGE FORMING APPARATUS

(75) Inventors: Shuichi Hamano, Saitama (JP); Ayumu Ono, Saitama (JP); Atsuya Baba, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 544 days.

(21) Appl. No.: 12/548,111

(22) Filed: Aug. 26, 2009

(65) Prior Publication Data
US 2010/0060950 A1 Mar. 11, 2010

(30) Foreign Application Priority Data
Sep. 8, 2008 (JP) ................................. 2008-229274

(51) Int. Cl.
*H04N 1/04* (2006.01)
(52) U.S. Cl. ......... 358/474; 358/444; 358/448; 358/449
(58) Field of Classification Search .................. 358/474, 358/444, 448, 449, 539
See application file for complete search history.

(56) References Cited

U.S. PATENT DOCUMENTS

| | | | |
|---|---|---|---|
| 2006/0192791 A1* | 8/2006 | Schick et al. | 345/661 |
| 2007/0285820 A1* | 12/2007 | Morita et al. | 360/48 |
| 2008/0297854 A1 | 12/2008 | Oteki | |

FOREIGN PATENT DOCUMENTS

| | | |
|---|---|---|
| JP | A-07-123188 | 5/1995 |
| JP | A-08-116411 | 5/1996 |
| JP | A-2005-229360 | 8/2005 |
| JP | A-2005-348376 | 12/2005 |
| JP | A-2006-129279 | 5/2006 |
| JP | A-2006-352740 | 12/2006 |
| JP | A-2008-301186 | 12/2008 |

OTHER PUBLICATIONS

Notification of Reasons for Refusal for Corresponding Japanese Patent Application No. 2008-229274, mailed on Sep. 13, 2010 (w/ English translation).

* cited by examiner

*Primary Examiner* — Houshang Safaipour
(74) *Attorney, Agent, or Firm* — Oliff & Berridge, PLC

(57) ABSTRACT

A document reading device includes: a document image acquisition unit that scans a document and obtains a document image; a document image storage unit that stores the document image obtained by the document image acquisition unit; a compression unit that compresses the document image stored in the document image storage unit; a determination unit that determines whether or not a document image file compressed by the compression unit has been normally produced; and a setting change unit that, in the case where it is determined that the document image file compressed has not been produced normally, changes a setting so as to recompress the document image stored in the document image storage unit with another setting.

6 Claims, 14 Drawing Sheets

FIG. 8A

| CODE | CONTENTS |
|---|---|
| 0x01 | SCAN DEMAND — 602 |
| 0x02 | RECOMPRESSION DEMAND — 604 |

SCAN DEMAND

| 0 | 0x01 |
|---|---|
| 1 | FORMAT TYPE — 610 |
| 2 | RESOLUTION — 612 |
| 3 | MAGNIFICATION — 614 |

RECOMPRESSION DEMAND

| 0 | 0x02 |
|---|---|
| 1 | FORMAT TYPE — 620 |
| 2 | RESOLUTION — 622 |
| 3 | MAGNIFICATION — 624 |

FIG. 8B

| CODE | CONTENTS |
|---|---|
| 0x11 | SCAN END — 626 |
| 0x12 | RECOMPRESSION END — 628 |

SCAN END

| 0 | 0x11 |
|---|---|
| 1 | IMAGE WIDTH — 630 |
| 2 | IMAGE LENGTH — 632 |
| 3 | DOCUMENT LENGTH — 634 |

RECOMPRESSION END

| 0 | 0x12 |
|---|---|
| 1 | IMAGE WIDTH — 636 |
| 2 | IAMGE LENGTH — 638 |

FIG. 9A

| CODE | CONTENTS |
|---|---|
| 0x21 | CONT. SCAN DEMAND | — 702
| 0x22 | CONT. RECOMPRESSION DEMAND | — 704
| 0x23 | CONT. JOB DELETE | — 706

CONT. SCAN DEMAND

| 0 | 0x21 |
|---|---|
| 1 | FORMAT TYPE |
| 2 | RESOLUTION |
| 3 | MAGNIFICATION |

— 710
— 712
— 714

CONT. RECOMPRESSION DEMAND

| 0 | 0x22 |
|---|---|
| 1 | FORMAT TYPE |
| 2 | RESOLUTION |
| 3 | MAGNIFICATION |

— 720
— 722
— 724

CONT. JOB DELETE

| 0 | 0x23 |
|---|---|

FIG. 9B

| CODE | CONTENTS |
|---|---|
| 0x31 | CONT. SCAN END | — 740
| 0x32 | CONT. RECOMPRESSION END | — 742
| 0x33 | CONT. SCAN ERROR | — 744

CONT. SCAN END

| 0 | 0x31 |
|---|---|
| 1 | EXIT CODE (NORMAL/ABNORMAL) |

— 750

CONT. RECOMPRESSION END

| 0 | 0x32 |
|---|---|
| 1 | EXIT CODE (NORMAL/ABNORMAL) |

— 754

CONT. SCAN ERROR

| 0 | 0x33 |
|---|---|

DOCUMENT READING DEVICE AND IMAGE FORMING APPARATUS

CROSS-REFERENCE TO RELATED APPLICATIONS

This application is based on and claims priority under 35 USC 119 from Japanese Patent Application No. 2008-229274 filed Sep. 8, 2008.

BACKGROUND

Technical Field

This present invention relates to a document reading device and an image forming apparatus.

SUMMARY

According to an aspect of the present invention, there is provided a document reading device comprising: a document image acquisition unit that scans a document and obtains a document image; a document image storage unit that stores the document image obtained by the document image acquisition unit; a compression unit that compresses the document image stored in the document image storage unit; a determination unit that determines whether or not a document image file compressed by the compression unit has been normally produced; and a setting change unit that, in the case where it is determined that the document image file compressed has not been produced normally, changes a setting so as to recompress the document image stored in the document image storage unit with another setting.

BRIEF DESCRIPTION OF THE DRAWINGS

An exemplary embodiment of the present invention will be described in detail based on the following figures, wherein:

FIGS. 8A and 8B are diagrams showing a command which is transmitted from a first command communication unit in the document reading device according to the exemplary embodiment of the present invention;

FIGS. 9A and 9B are diagrams showing a command which is transmitted from a second command communication unit in the document reading device according to the exemplary embodiment of the present invention;

DETAILED DESCRIPTION

Next, an exemplary embodiment of the present invention will be described based on the drawings.

Figure 1:
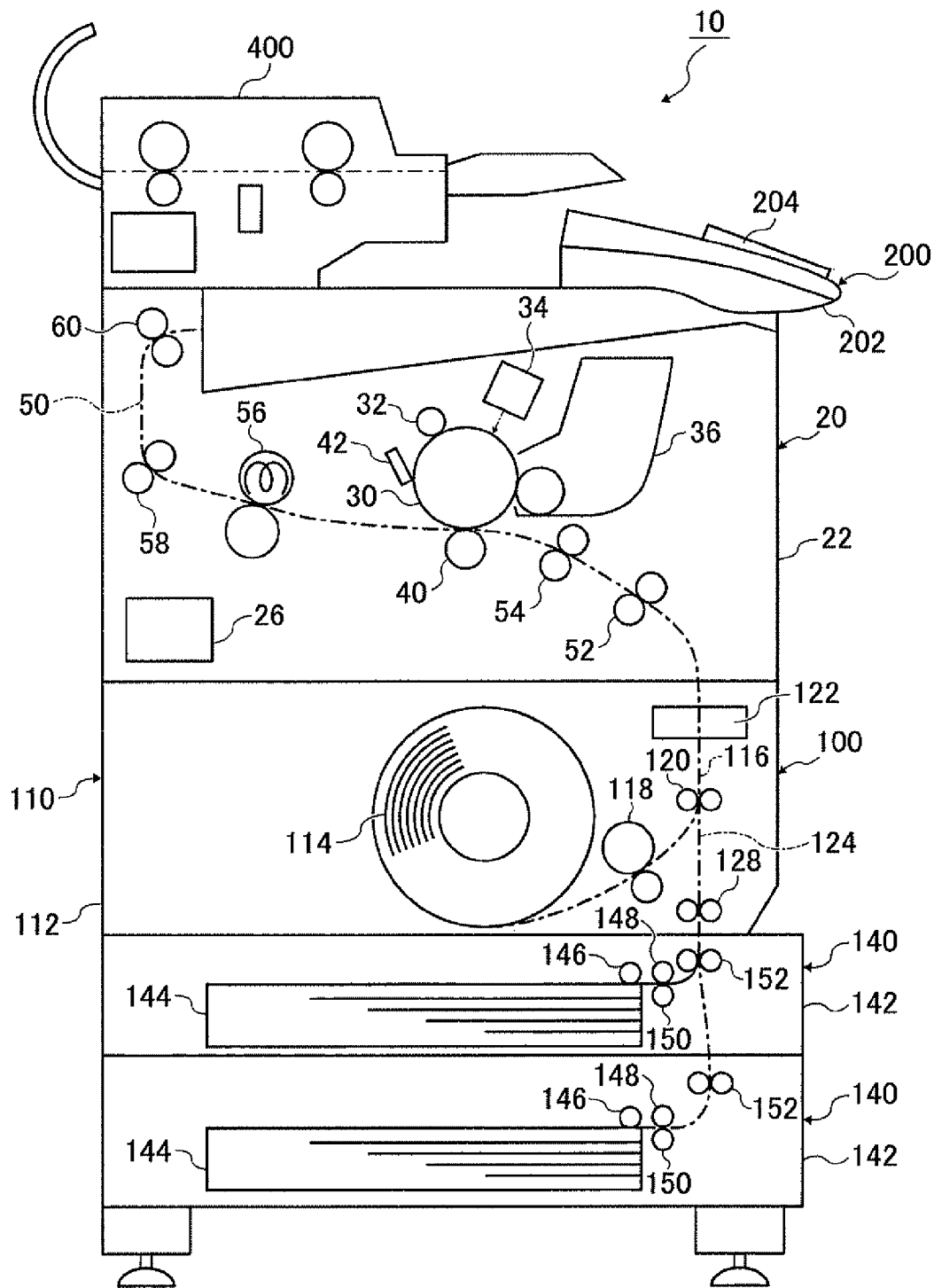
FIG. 1 is a side view showing an image forming apparatus according to an exemplary embodiment of the present invention.

FIG. 1 shows an image forming apparatus 10 according to the exemplary embodiment of the present invention. The image forming apparatus 10 has an image forming unit 20, a control unit 26, a medium supply device 100, a display operation unit 200, and a document reading unit 400.

The display operation unit 200, used as a user interface, has a display operation unit main body 202. A touch panel 204, used as a display unit and as an operation unit, is attached to the display operation unit 200. Note that the touch panel means a device enabling an input operation by touching a screen with a finger or a specialized pen. Also, the touch panel detects the position touched by the finger or the like, and specifies a position on the screen, to provide an instruction to an operation object.

The touch panel 204 allows color mode, output file format, scan resolution, and scan magnification or the like to be inputted and set, when a document is read with the document reading unit 400.

A medium supply device 100 is a device supplying a medium on which image formation is performed, e.g. normal paper, to the image forming unit 20. The medium supply device 100 has e.g. one roller medium supply device 110 and e.g. two cut-medium supply devices 140. The two cut-medium supply devices 140 are arranged in layer under the roller medium supply device 110. Note that the roller medium means a rolled medium such as a roll sheet for image formation. Further, note that, cut-medium means a medium such as a paper cut in a size such as A4 size or B5 size, such as paper, for image formation.

The roller medium supply device 110 has a roller medium supply device main body 112. A roller medium 114 is attached in the roller medium supply device main body 112 so as to rotate and draw out the tip of the roller medium 114. Further, a roller medium transport path 116 as a path where the roller medium is transported is formed in the roller medium supply device main body 112. A drawing roller 118, a transport roller 120, and a cutting device 122 are attached in the roller medium supply device main body 112 along the roller medium transport path 116, sequentially from the upstream side in the roller medium transport direction.

The drawing roller 118 is used for drawing out the tip of the roller medium in a rolled state and drawing out the tip toward the downstream side in the roller medium transport direction. The transport roller 120 is used for transporting the sheet drawn out with the drawing roller 118 toward further downstream side, i.e., the image forming unit 20 side. The cutting device 122 is used for cutting a rear end side of the roller medium 114 supplied to the image forming unit 20 by a necessary length.

Further, a passing transport path 124, through which the cut medium respectively supplied from the two cut-medium supply devices 140 are passed upon transporting to the image forming unit 20 side, is formed in the roller medium supply device main body 112. A transport roller 128 is used for transporting the cut-medium supplied from the two cut-medium supply devices 140 toward the image forming unit 20 side.

The two cut-medium supply devices 140 respectively have a cut-medium supply device main body 142. A cut-medium container 144, storing the cut-medium in a stacked state, is attached in the cut-medium supply device main body 142, so as to insert into or pull out of e.g. the cut-medium supply device main body 142. Further, a feed roller 146 which feeds a topmost cut-medium in the cut-medium container 144 toward the downstream side in the cut-medium transport direction, a transport roller 148 which transports the cut-medium drawn with the feed roller 146 toward further upstream side, and a separating roller 150 which separates the cut-medium so as to prevent double feed of the cut-medium, are attached in the cut-medium supply device main body 142. Further, a transport roller 152 is attached on the downstream side of the transport roller 148 and the separating roller 150.

The cut medium, supplied from one of the two cut-medium supply devices 140 provided on the lower side, is transported through the cut-medium supply device main body 142 positioned on the upper side and the roller medium supply apparatus main body 112 to the image forming unit 20. Further, the cut medium, supplied from one of the two cut-medium supply devices 140 provide on the upper side, is transported through the roller medium supply device main body 112 to the image forming unit 20.

The image forming unit 20 may perform e.g. image formation based on the document image, obtained with the document reading unit 400, and e.g. image formation of monochrome image such as a black image. The image forming unit 20, e.g. an electrophotographic type unit, has an image forming unit main body 22. A medium transport path 50, through which a medium supplied from the medium supply device 100 passes, is formed in the image forming unit main body 22.

Further, an image carrier 30 such as a photoreceptor drum, a charging device 32 charging the image carrier 30 uniformly, a latent image forming device 34 forming a latent image on the image carrier 30 uniformly charged with the charging device 32, a developing device 36 enabling, with a toner, visualization of the latent image on the image carrier 30 formed with the latent image forming device 34, a transfer device 40 transferring a toner image formed with the developing device 36 to a medium, and a cleaning device 42 cleaning toner remaining on the image carrier 30, are attached in the image forming unit main body 22.

Further, a transport roller 52, a registration roller 54, a fixing device 56, a transport roller 58, and a discharge roller 60 are attached in the image forming unit main body 22, along the medium transport path 50, sequentially from the upstream side in the medium transport direction. The transport roller 52 transports the medium toward the registration roller 54. The registration roller 54 proceeds rotation from a stopped state oat predetermined timing, to send the medium to a contact portion between the image carrier 30 and the transfer device 40 at the timing of formation of a toner image on the image carrier 30.

The fixing device 56 fixes the toner image transferred with the transfer device 40 onto the medium, to the medium with pressure and heat. The discharge roller 60 is used for discharging the medium to which the toner is fixed, to the outside of the image forming unit main body 22.

The control unit 26 is attached in e.g. the image forming unit main body 22. The control unit 26 is used for controlling the image forming apparatus 10, having a substrate with a processing device such as CPU, and storage such as a memory.

Figure 2:
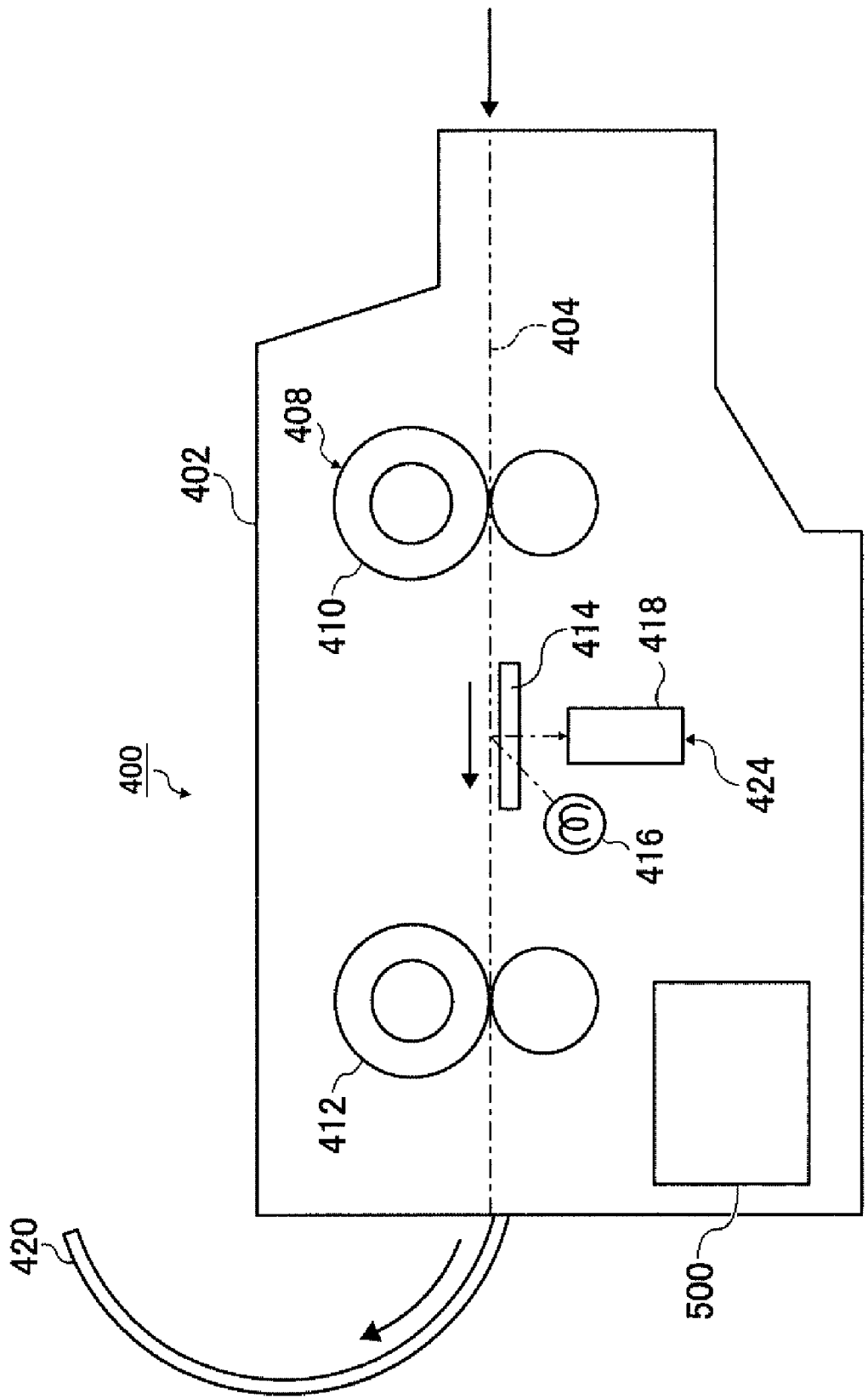
FIG. 2 is a side view showing a document reading unit in the image forming apparatus according to the exemplary embodiment of the present invention.

FIG. 2 shows the document reading unit 400.

The document reading unit 400 reads single color or multi-color image, and has a document reading unit main body 402. A document transport path 404 through which the document passes, is formed in the document reading unit main body 402. Further, a document transport part 408 for transporting the document is attached in the document reading unit main body 402. The document transport part 408 has a transport roller 410 provided on the upstream side in the document transporting direction and a transport roller 412 provided on the downstream side in the document transporting direction.

Further, a document image acquisition part 424 used as a document image acquisition unit for scanning a document and obtaining the document image, is attached in the document reading unit main body 402. The document image acquisition part 424 has a light transmitting member 414, a light irradiation device 416, and a photoelectric converting member 418. The light transmitting member 414 is made from a light transmitting material such as glass, and is provided e.g. below the document transport path 404. The light irradiation device 416, e.g. a xenon lamp, irradiates the document transported through the document transport path 404 with light through the light transmitting member 414.

The photoelectric converting member 418, provided in a portion where light irradiated from the light irradiation device 416, reflected with rear surface of the document, and collected with an optical system (not shown) enters, converts the incident light into an electric signal. As the light converting member 418, e.g. a CCD array is used. When a CCD array is used, the CCD array has a light receiving sensor for three RGB colors.

A guide member 420 to guide a part of the document discharged with the transport roller 412 to the outside the document reading unit main body 402, to the front side of the image forming apparatus 10 (right side in FIG. 2), is attached to the outside of the document reading unit main body 402. Further, a control unit 500 mainly used for controlling the document reading unit 400, is attached in the document reading unit main body 402. The control unit 500 has a substrate with a processing device such as CPU, and a storage such as a memory.

Figure 3:
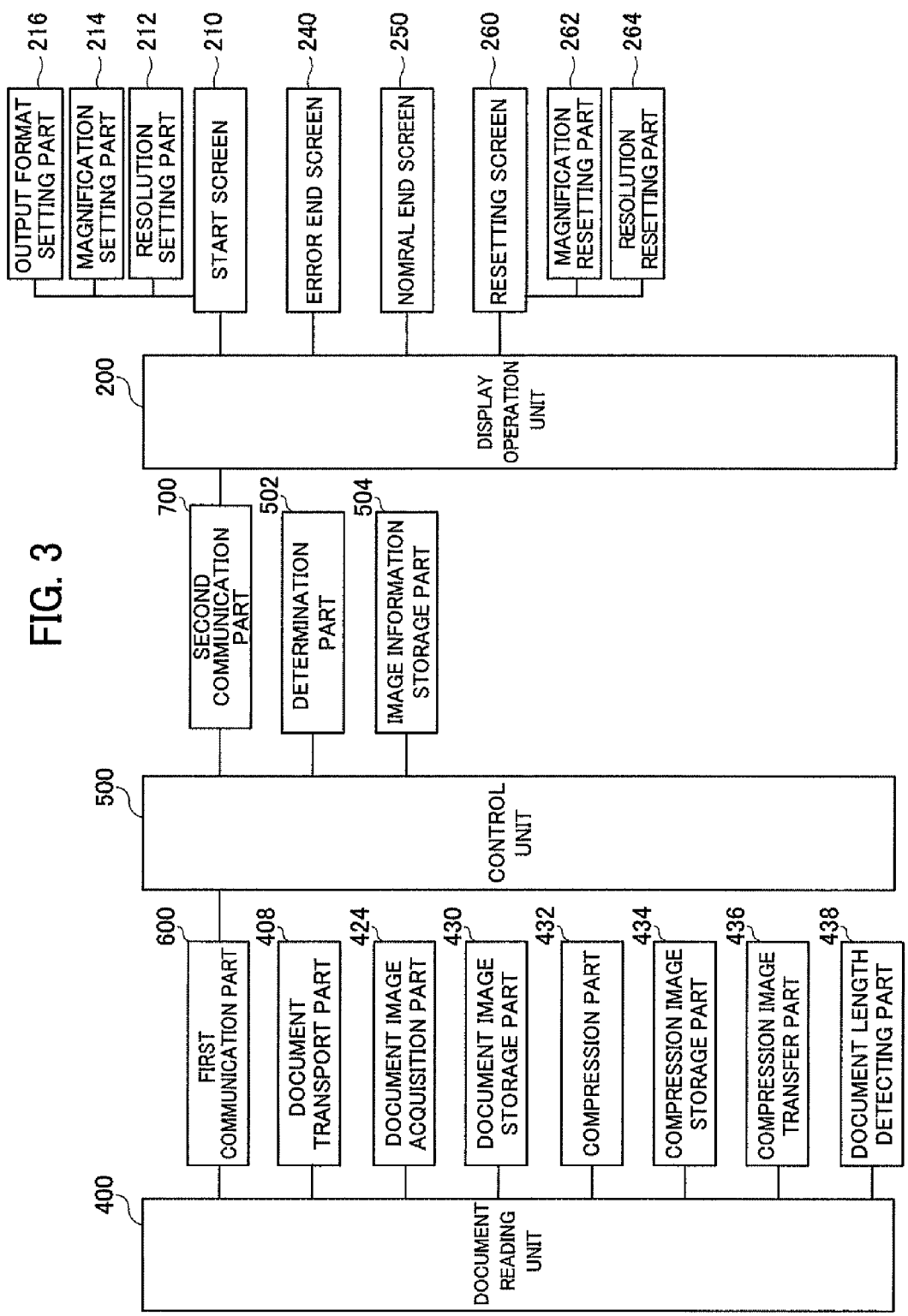
FIG. 3 is a block diagram showing a configuration of the image forming apparatus according to the exemplary embodiment of the present invention.

FIG. 3 is a block diagram showing main parts of the image forming apparatus 10.

The image forming apparatus 10, as above-described, has the document reading unit 400, the control unit 500, and the display operation unit 200.

The document reading unit 400, as above described, has the document transport part 408 and the document image acquisition part 424, in addition, as shown in FIG. 3, having a document image storage part 430 used as a document image storage unit, a compression part 432 used as a compression unit, a compression image storage part 434, a compression image transfer part 436, and a document length detecting part 438 used as a document detecting unit. As the document image storage part 430, the compression part 432, the compression image storage part 434, and the compression image transfer part 436, processing circuits such as CPU, and storages such as a memory, in the control unit 500 are used. As the document length detecting part 438, sensors, CPU, and the like are used.

The document image storage part 430 does not perform compressing of the document image obtained with the document image acquisition part 424, but stores the document image as e.g. bitmap data. Further, the document image storage part 430 stores the image length and the image width of the document image obtained with the document image acquisition part 424, and the document length detected with the document length detecting part 438. The compression part 432 compresses the document image, which is obtained with the document image acquisition part 424, and e.g., once stored into the document image storage part 430, with an output format setting such as JPEG. The compression image storage part 434 stores the document image compressed with the compression part 432. The compression image transfer part 436 transfers the document image compressed with the compression part 432 to the control unit 500.

Note that the compression may start before the image length and the image width of the document image, and document length are obtained, and then, the compression for a document image starts while the document is scanned in the image forming apparatus 10. Accordingly, before the document size has been determined, production of the compression image data starts. Therefore, compared with e.g. the case where the compression starts, following the document size has been determined after document scanning, processing time at which a series of processing has been performed reduces, and processing efficiency improves. However, since the compression starts before the determination of the document size has been completed, a capacity of the scanned image is too much, and accordingly the series of processing may fail to compress the scanned image.

The control unit 500 has a determination part 502 used as a determination unit and an image information storage part 504. The determination part 502 determines whether or not the document image file compressed with the compression part 432 has been changed normally. The determination may be performed with parameters showing the image width and the image length which are set on a scan end command to be described later. For instance, in cases where JPEG, in which number of dots on a side is limited to be equal to or lower than 65535 dots, is used as the compression format type, as a result of detecting the document image size (for the image width and the image length) scanned with the document reading unit 400, if at least, one of the image width and the image length have more than 65535 dots thereon, it is determined that the file has not produced normally. On the other hand, as a result of detecting the document image size (for the image width and the image length) scanned with the document reading unit 400, if both of the image width and the image length have less than 65535 dots thereon, it is determined that the file has been produced normally. The image information storage part 504 is used for storing image information.

The display operation unit 200 has a start screen 210, an error end screen 240, a normal end screen 250, and a resetting screen 260. The start screen 210, the error end screen 240, the normal end screen 250, and the resetting screen 260 are displayed on the touch panel 204 in the display operation unit 200.

The start screen 210, which is a screen displayed on the touch panel 204 when scan of a document starts, has an output format setting part 216 used for setting an output format of the image scanned, a magnification setting part 214 used for setting a scan magnification, and a resolution setting part 212 used for setting a scan resolution.

The error end screen 240 is a screen displayed on the touch panel 204, when the compressed file has not been produced normally even if the resetting is performed for a recompression following failing to normally produce a file in the previous compression. The normal end screen 250 is a screen displayed on the touch panel 204, when image scanning and production of the compressed file has successfully been performed, and the series of processing has been normally performed.

The resetting screen 260 is a screen displayed on the touch panel 204, when the compressed file may be produced successfully if the resetting is performed for a recompression following failing to normally produce a file in the previous compression. The resetting screen 260 has a magnification resetting part 262 used for changing a scan magnification of the document by resetting, and a resolution resetting part 264 used for resetting a document scan resolution.

The document reading unit 400 and the control unit 500 are connected each other via a first communication part 600. The first communication part 600 is used for transmitting and receiving commands between the document reading unit 400 and the control unit 500. Further, the control unit 500 and the display operation unit 200 are connected each other via a second communication part 700. The second communication part 700 is used for transmitting and receiving commands between the control unit 500 and the display operation unit 200.

Figure 4:
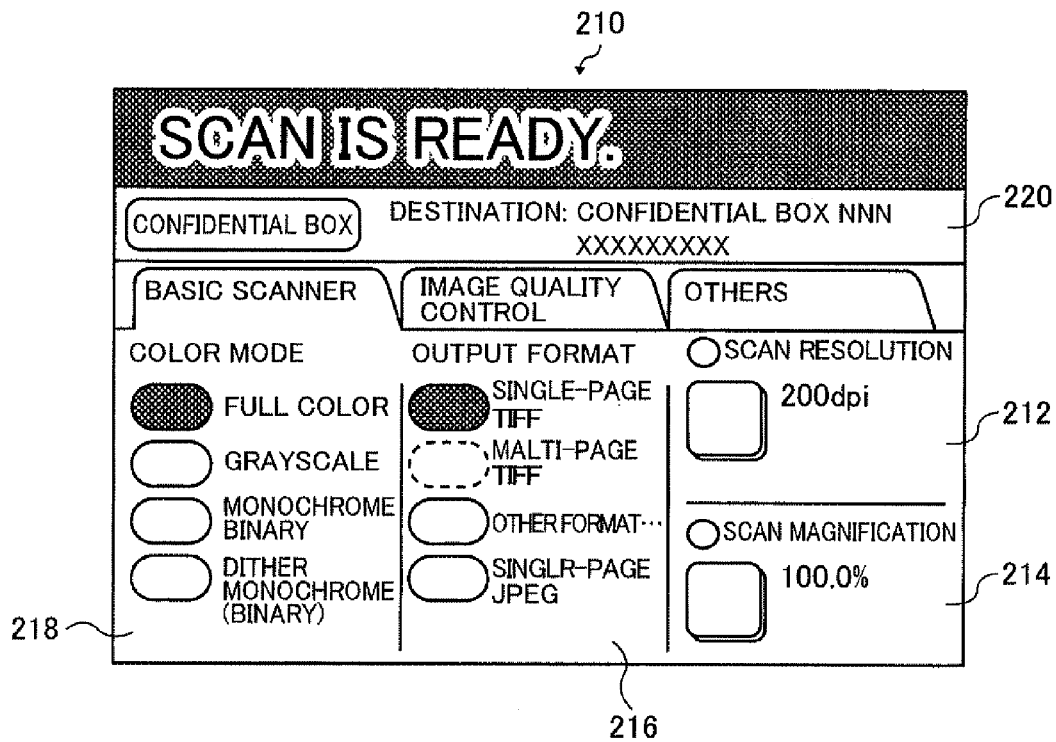
FIG. 4 is a diagram of a start screen displayed on a touch panel in the document reading device according to the exemplary embodiment of the present invention.

FIG. 4 shows the start screen 210. The start screen 210 has, as above described, the resolution setting part 212, the magnification setting part 214, and the output format setting part 216, and further, having a color mode setting part 218 for setting color(s) used in scanning a document, and a destination display part 220 for displaying a destination of the document image scanned. The resolution setting part 212 allows the resolution for scanning the document to be selected from e.g. plural resolution types predetermined. FIG. 4 shows a state which a resolution of 200 dots is selected.

The magnification setting part 214 provides a setting of the scan magnification, when a document is scanned, within a predetermined range, by e.g. 0.1 percent of the magnification. FIG. 4 shows the state of setting the scan magnification to 100 percent.

The output format setting part 216 provides a selection of format type for compressing a document image from plural format types predetermined. FIG. 4 shows a state of selecting JPEG single page as a format type used for compressing a file.

The color mode setting part 218 provides a selection of the color mode in scanning the document from plural color modes predetermined. FIG. 4 shows a state of selecting full-color mode as color mode.

Figure 5:
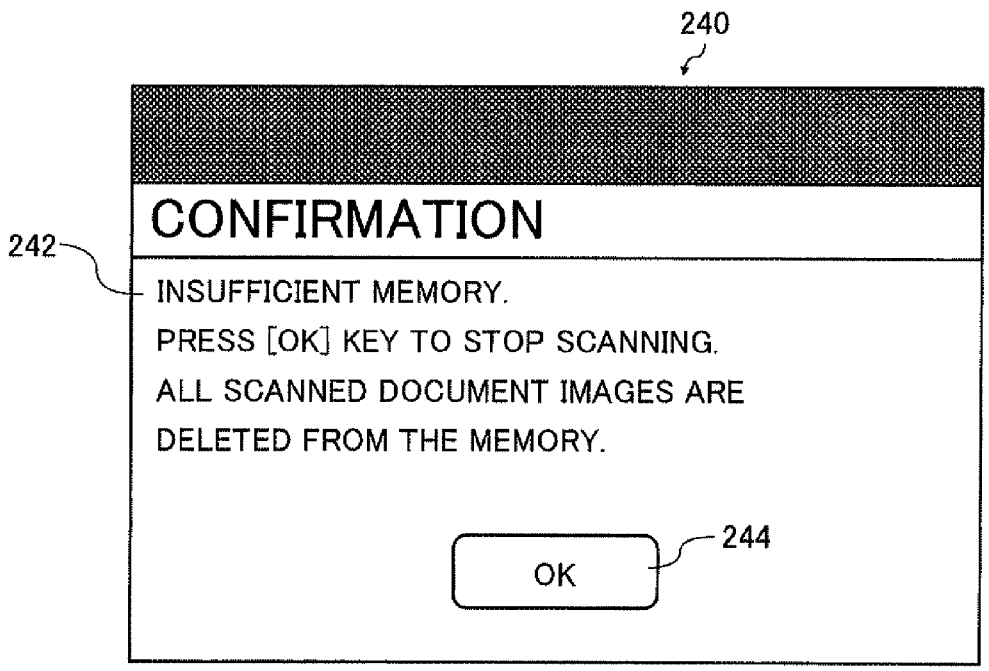
FIG. 5 is a diagram of an error end screen displayed on the touch panel in the document reading device according to the exemplary embodiment of the present invention.

FIG. 5 shows the error end screen 240.

The error end screen 240 has an error display part 242 displayed the cause of the error such as insufficient memory, and a monitoring and operation part 244 operated by an operator in monitoring the error.

Figure 6:
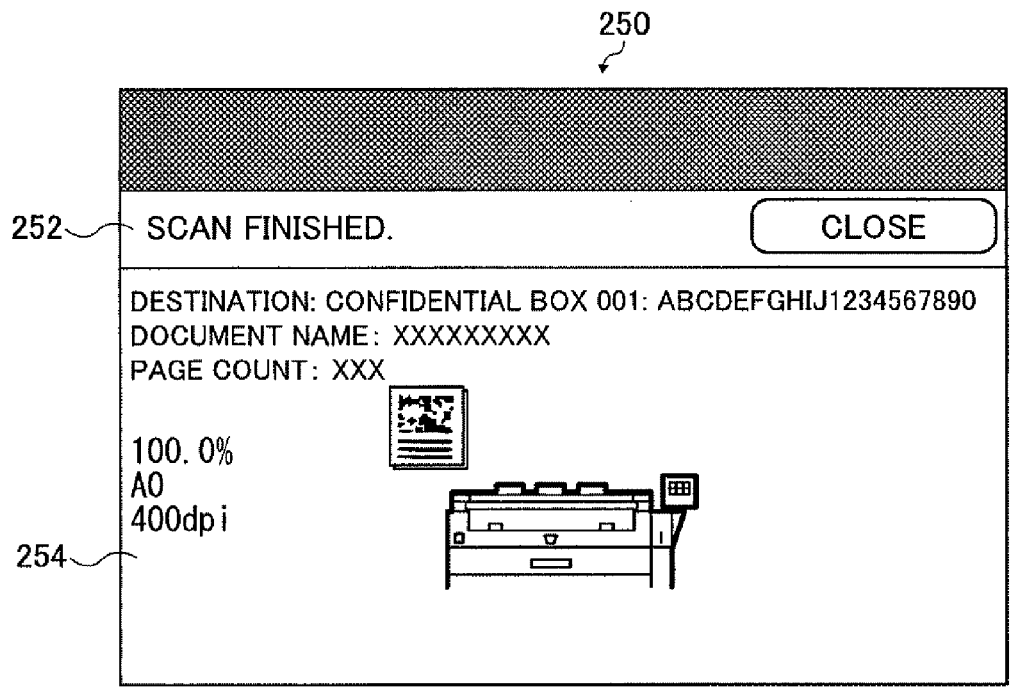
FIG. 6 is a diagram of a normal end screen displayed on the touch panel in the document reading device according to the exemplary embodiment of the present invention.

FIG. 6 shows the normal end screen 250. The normal end screen 250 has a preservation information display part 252 showing a location where the document data are saved, and a setting display part 254 showing the setting of the document data saved.

Figure 7:
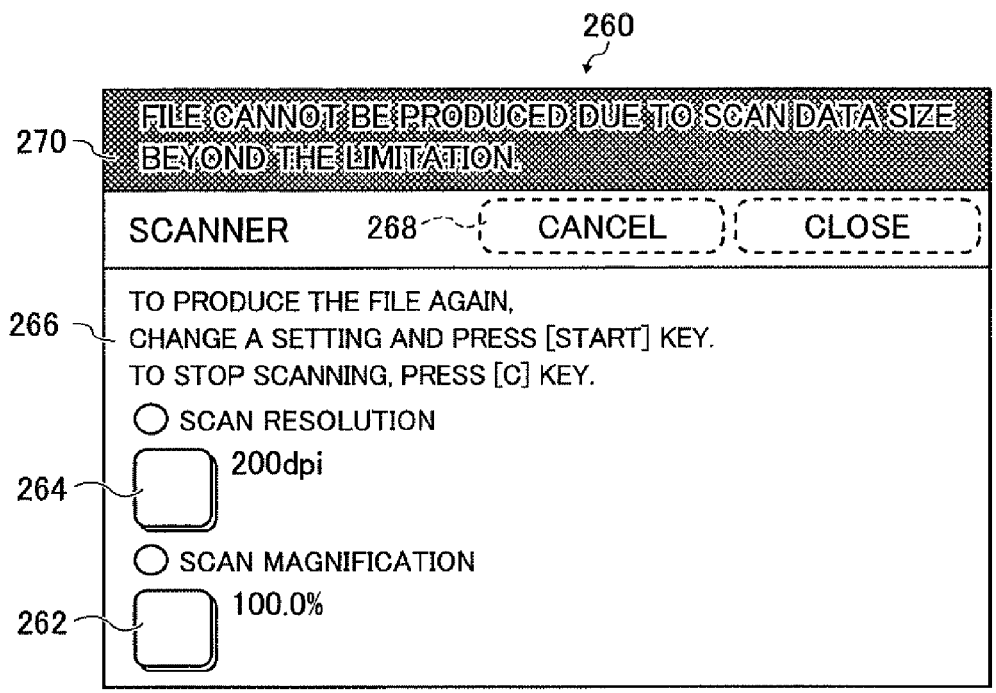
FIG. 7 is a diagram of a resetting screen displayed on the touch panel in the document reading device according to the exemplary embodiment of the present invention.

FIG. 7 shows the resetting screen 260.

The resetting screen 260 has, as above described, the magnification resetting part 262 and the resolution resetting part 264, and further, has an error display part 270, a notification part 266 notifying an operator that the setting needs change, and a cancel operation part 268. The error display part 270 displays the message that, the document image file compressed has not been produced normally in the current setting, together with e.g. a message of the reason for the error. The notification part 266 displays the setting of notification so as to set the setting of document image compression. The cancel operation part 268 is, in the case where the document image compression is canceled, operated by the operator instead of changing the setting for the document image compression.

FIGS. 8A and 8B show commands which are transmitted and received via the first communication part 600 between the document reading unit 400 and the control unit 500. FIG. 8A shows commands transmitted from the control unit 500 to the document reading unit 400, and FIG. 8B shows commands transmitted from the document reading unit 400 to the control unit 500.

As shown in FIG. 8A, commands transmitted from the control unit 500 to the document reading unit 400 include a scan demand command 602 and a recompression demand command 604. The scan demand command 602 is a command to demand the document reading unit 400 to compress the document image. Parameters set in the scan demand command 602 include format type 610 for compressing the document image, resolution 612 at which the document is scanned, and magnification 614 at which the document is scanned.

The recompression demand command 604 is a command which, in the case where the document image file compressed has not been produced normally, demands the document reading unit 400 so as to recompress the document image stored in the document image storage part 430, with a different setting from the previous setting failed to compress. Parameters set in the recompression demand command 604 include format type 620 for recompressing the document data, resolution 622 at which the document data are recompressed, and magnification 624 at which the document data are recompressed.

As shown in FIG. 8B, commands transmitted from the document reading unit 400 to the control unit 500 include a scan end command 626 and a recompression end command 628. The scan end command 626 is a command to notify the control unit 500 that the scan of the document image and the production of the document image file compressed have been done. Parameters set in the scan end command 626 include image width 630, image length 632, and document length 634. Note that the image width means a number of dots by which an image is constructed in a direction vertical to the document transporting direction. Further, the image length means a number of dots by which an image is constructed in the document transporting direction. The document length described herein is expressed in millimeters.

The recompression end command 628 is a command which notifies the control unit 500 that recompression of the document image stored in the document image storage part 430 following change of the compression setting, has been done. Parameters set in the recompression end command 628 include the image width 636 and the image length 638.

FIGS. 9A and 9B show commands which are transmitted and received via the second communication part 600 between the display operation unit 200 and the control unit 500. FIG. 9A shows commands transmitted from the display operation unit 200 to the control unit 500, and FIG. 9B shows commands transmitted from the control unit 500 to the display operation unit 200.

As shown in FIG. 9A, commands transmitted from the display operation unit 200 to the control unit 500 include a scan demand command 702, a recompression demand command 704, and a JOB deletion command 706. The scan demand command 702 is a command to demand the control unit 500 to compress the document image. Parameters set in the scan demand command 702 include format type 710 for compressing the document data, a resolution 712 at which the document is scanned, and a magnification 714 at which the document is scanned.

The recompression demand command 704 is a command which, in the case where the document image file compressed has not been produced normally, demands the control unit 500 so as to recompress the document image stored in the document image storage part 430, with a different setting from the previous setting failed to compress. Parameters set in the recompression demand command 704 include format type 720 for recompressing the document data, a resolution 722 at which the document data are recompressed, and a magnification 724 at which the document data are recompressed.

The JOB deletion command 706 is a command demanding the control unit 500 to delete a JOB.

As shown in FIG. 9B, commands transmitted from the control unit 500 to the document reading unit 400 include a scan end command 740, a recompression end command 742, and a scan error command 744. The scan end command 740 is a command to notify the display operation unit 200 that scan of the document image and production of the document data compressed have terminated. As a parameter, the scan end command 740 has an exit code 750 showing that scan have normally terminated, or that a defect of scan is caused.

The recompression end command 742 is a command which notifies the display operation unit 200 that recompression of the document image stored in the document image storage part 430 has been done. As a parameter, the recompression end command 742 has an exit code 754 showing that the document image file compressed has been normally produced, or not.

Figure 10:
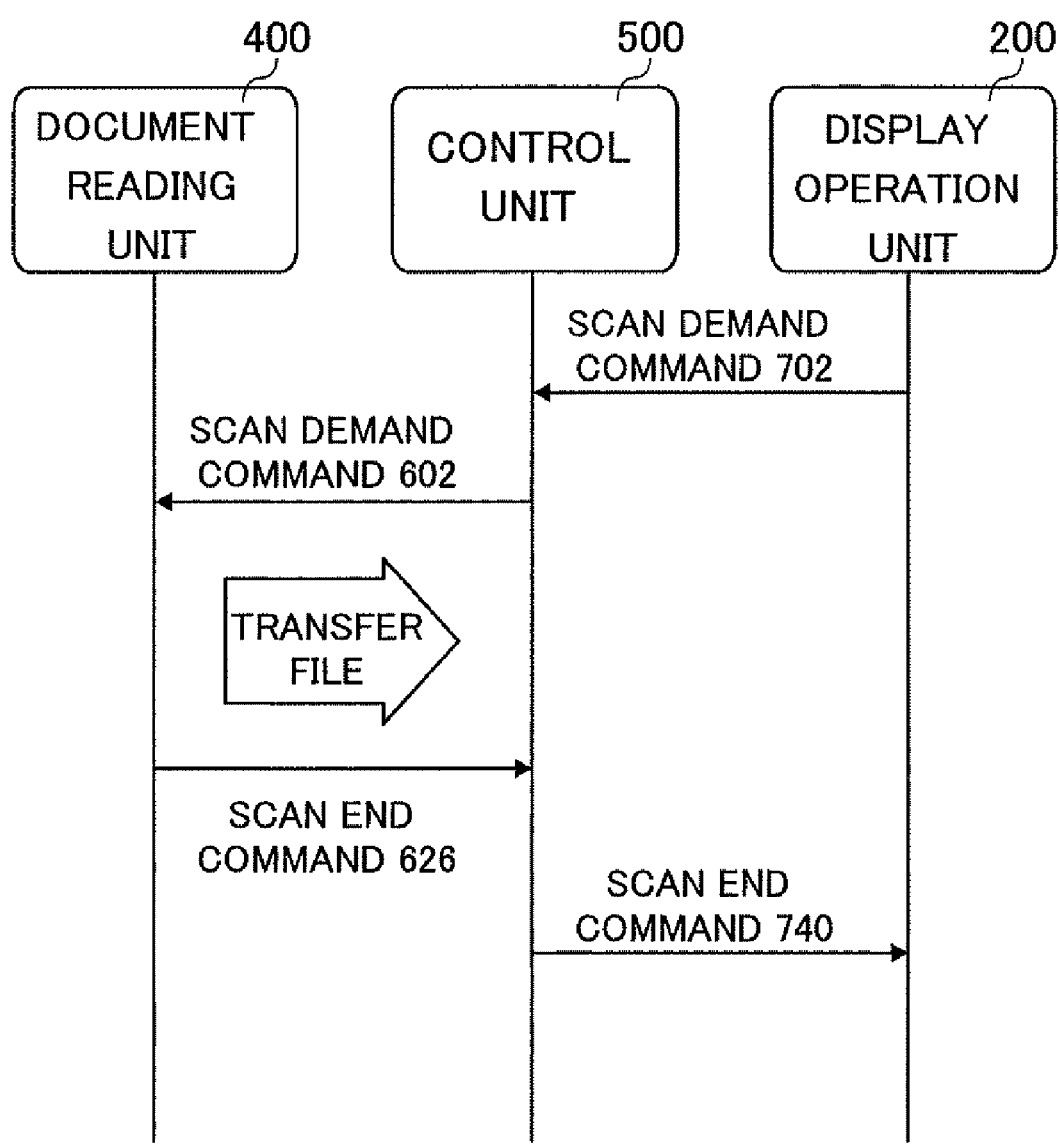
FIG. 10 is a first sequence chart explaining the operation of the document reading device according to the exemplary embodiment of the present invention.

FIG. 10 explains operations in the case that the document data has been normally compressed in the image forming apparatus 10. As shown in FIG. 10, at first, the scan demand command 702 is transmitted from the display operation unit 200 to the control unit 500. Next, the scan demand command 602 is transmitted from the control unit 500 to the document reading unit 400.

Next, the document reading unit 400 receives the scan demand command 602, obtaining the document image with the document image acquisition part 424. Further the document reading unit 400 stores the obtained document image into the document image storage part 430, subsequently compressing the obtained document image with the compression part 432. And further, the document reading unit 400 stores the compressed image into the compression image storage part 434, subsequently transferring the compressed image (file) with the compression image transfer part 436 to the control unit 500.

Next, the document reading unit 400 transmits the scan end command 626 to the control unit 500.

Next, the control unit 500 determines whether or not scan has been normally performed, that is, whether or not the compressed document image compressed has been normally produced. When used JPEG as an output format, the control unit 500 determines, in the cases where both of image width and image length are equal to or lower than 65535 dots, limited by standard of JPEG, that the scan had been normally performed, or in the cases where at least one of the image width and image length is higher than 65535 dots, that scan has not been performed normally.

FIG. 10 shows the operation for a determination that the scan had been normally performed, and the scan end command 740 is transmitted from the control unit 500 to the display operation unit 200. Received the scan end command 740, the display operation unit 200 operates the touch panel 204 to display the normal end screen 250.

Figure 11:
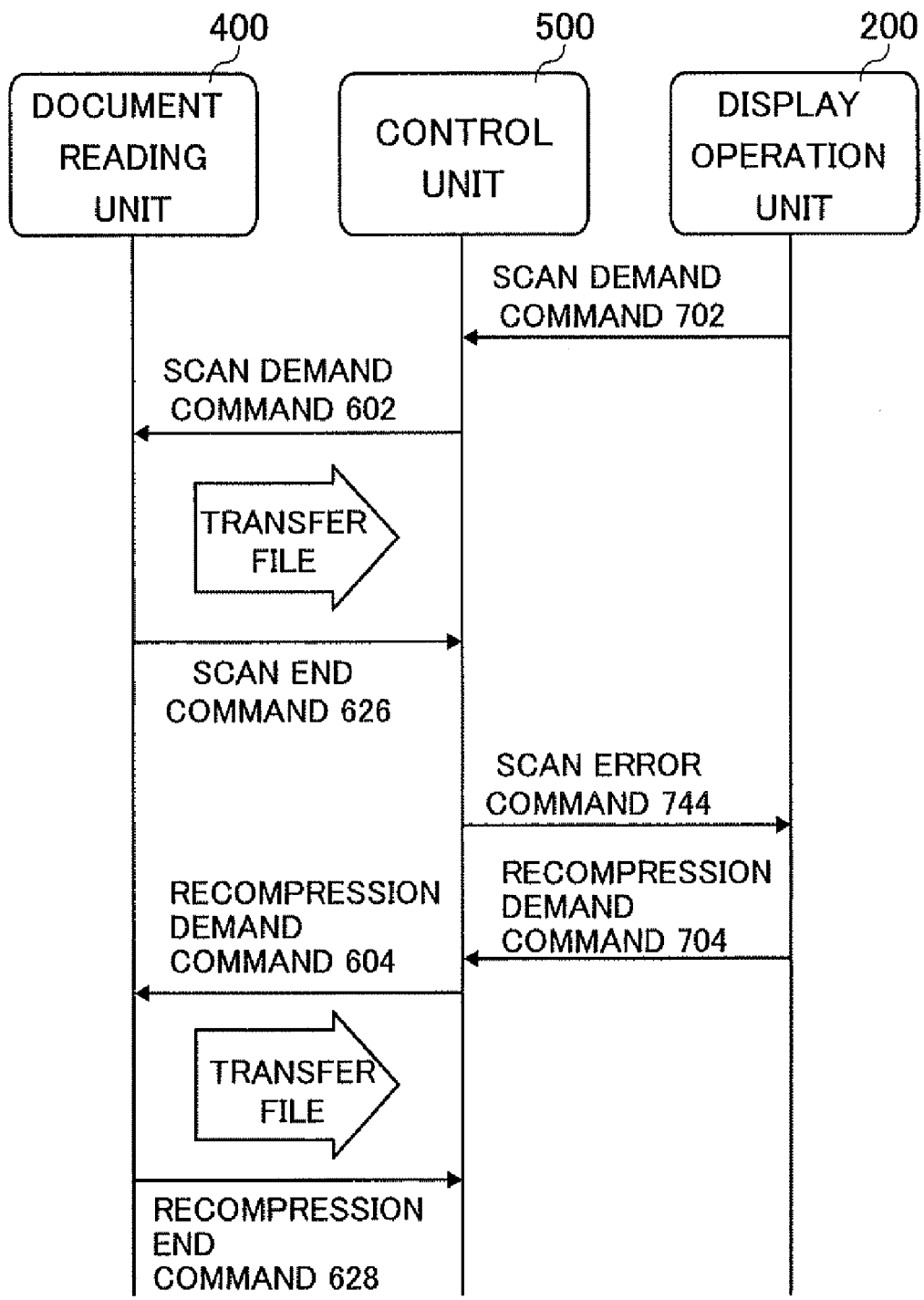
FIG. 11 is a second sequence chart explaining the operation of the document reading device according to the exemplary embodiment of the present invention.

FIG. 11 explains operations in the case where an operator changes a compression setting following the determination that the document image file compressed has not been produced normally in the image forming apparatus 10.

As shown in FIG. 11, similar to the case where the document image file compressed has been normally produced, the scan demand command 702 is transmitted from the display operation unit 200 to the control unit 500, and the scan demand command 602 is transmitted from the control unit 500 to the document reading unit 400. Next, the document reading unit 400 is received the scan demand command 602, obtaining the document image with the document image acquisition part 424. Further the document reading unit 400 stores the obtained document image into the document image storage part 430, subsequently compressing the obtained document image with the compression part 432. And further, the document reading unit 400 stores the compressed image into the compression image storage part 434, subsequently transferring the compressed image (file) with the compression image transfer part 436 to the control unit 500. Further the document reading unit 400 transmits the scan end command 626 to the control unit 500.

Next, the control unit 500 determines whether or not the document image file compressed has been normally produced. When used JPEG as an output format, the control unit 500 determines, in the cases where both of image width and image length are equal to or lower than 65535 dots, limited by standard of JPEG, that the document image file compressed has been normally produced, or in the cases where at least one of the image width and image length is higher than 65535 dots, that the document image file compressed has not been produced normally.

FIG. 11 shows the operation for a determination that the document file compressed had not been produced normally, and the scan error command 744 is transmitted from the control unit 500 to the display operation unit 200. Receiving the scan error command 744, the display operation unit 200 operates the touch panel 204 to display the resetting screen 260.

Next, based on the setting changed with the resetting screen 260 by the operator, the recompression demand command 704 is transmitted from the display operation unit 200 to the control unit 500. At this time, the parameter, i.e., the recompression demand command 704 is transmitted in a setting changed with the resetting screen 260.

Next, the recompression demand command 604 is transmitted from the control unit 500 to the document reading unit 400. Receiving the recompression demand command 604, the document reading unit 400 compresses the document image stored with non-compressed in the document image storage part 430, with the compression part 432 on the basis of a new setting. Further the document reading unit 400 stores the image compressed into the compression image storage part 434, transferring the compressed image (file) with the compression image transfer part 436 to the control unit 500. Next, the document reading unit 400 transmits the recompressed end command 628 to the control unit 500.

After that, similar to the case where the compressed image is transferred to the control unit 500 following a receiving of the scan demand command 602, the control unit 500 determines the image compressed, which is transmitted to the control unit 500 following a receiving of the recompression demand command 604, whether or not the document image file compressed has been normally produced.

Figure 12:
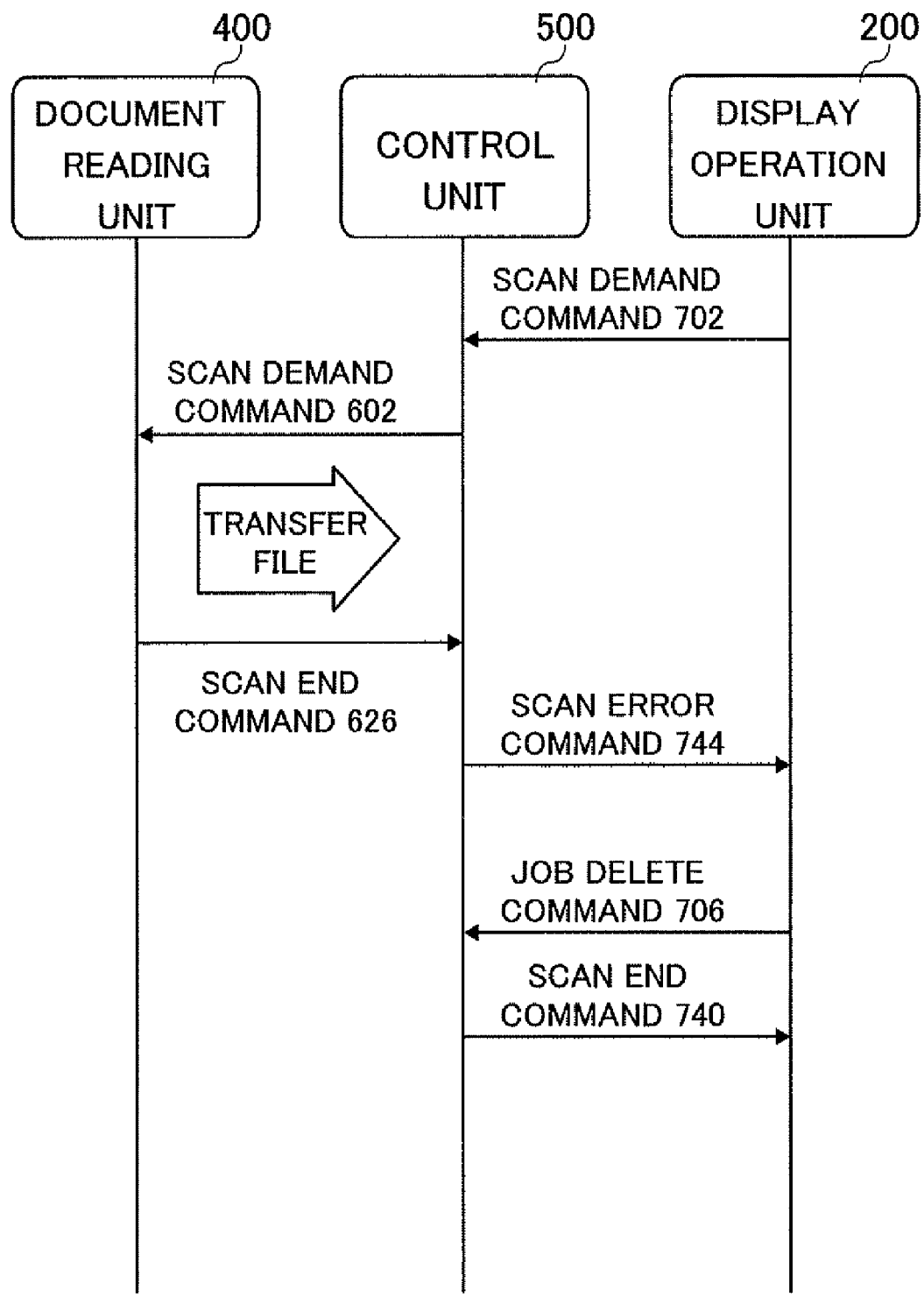
FIG. 12 is a third sequence chart explaining the operation of the document reading device according to the exemplary embodiment of the present invention.

FIG. 12 explains operations in the image forming apparatus 10 in the case where an operator cancels the operation for compressing the document if the document image file compressed has not been produced normally.

As shown in FIG. 12, similar to the case where the compression setting is changed by the operator following failure to normally produce the document image file compressed, the scan demand command 702 is transmitted from the display operation unit 200 to the control unit 500, and subsequently the scan demand command 602 is transmitted from the control unit 500 to the document reading unit 400. Further, receiving the scan demand command 602, the document reading unit 400 obtains the document image with the document image acquisition part 424, subsequently storing the obtained document image into the document image storage part 430. Further, the document reading unit 400 compresses the obtained document image with the compression part 432, and subsequently stores the compressed image into the compression image storage part 434. Further, the document reading unit 400 transfers the compressed image (file) with the compression image transfer part 436 to the control unit 500, and transmits the scan end command 626 to the control unit 500.

Next, the control unit 500 determines whether or not the document image file compressed has been normally produced. When used JPEG as an output format, the control unit 500 determines, in the cases where both of age width and image length are equal to or lower than 65535 dots, limited by standard of JPEG, that the document image file compressed has been normally produced, or in the cases where at least one of the image width and image length is higher than 65535 dots, that the document image file compressed has not been produced normally.

FIG. 12 shows the operation for a determination that the scan has abnormally been performed, and the scan error command 744 is transmitted from the control unit 500 to the display operation unit 200. Receiving the scan error command 744, the display operation unit 200 operates the touch panel 204 to display the resetting screen 260.

In the previous described embodiment, it is explained the case where the operator operates with at least one of the magnification resetting part 262 and the resolution resetting part 264 in the resetting screen 260 to change the setting. In this described embodiment herein, it is explained the case where document scan is canceled with the cancel operation part 268 of the resetting screen 260 by operator.

When the document scan is canceled by operating the cancel operation part 268, the JOB deletion command 706 is transmitted from the display operation unit 200 to the control 500. Receiving the JOB deletion command 706, the control unit 500 transmits the scan end command 740, in which the abnormal of the exit code is selected, to the display operation unit 200. Receiving the scan end command 740, the display operation unit 200 operates the touch panel 204 to display the error end screen 240.

Figure 13:
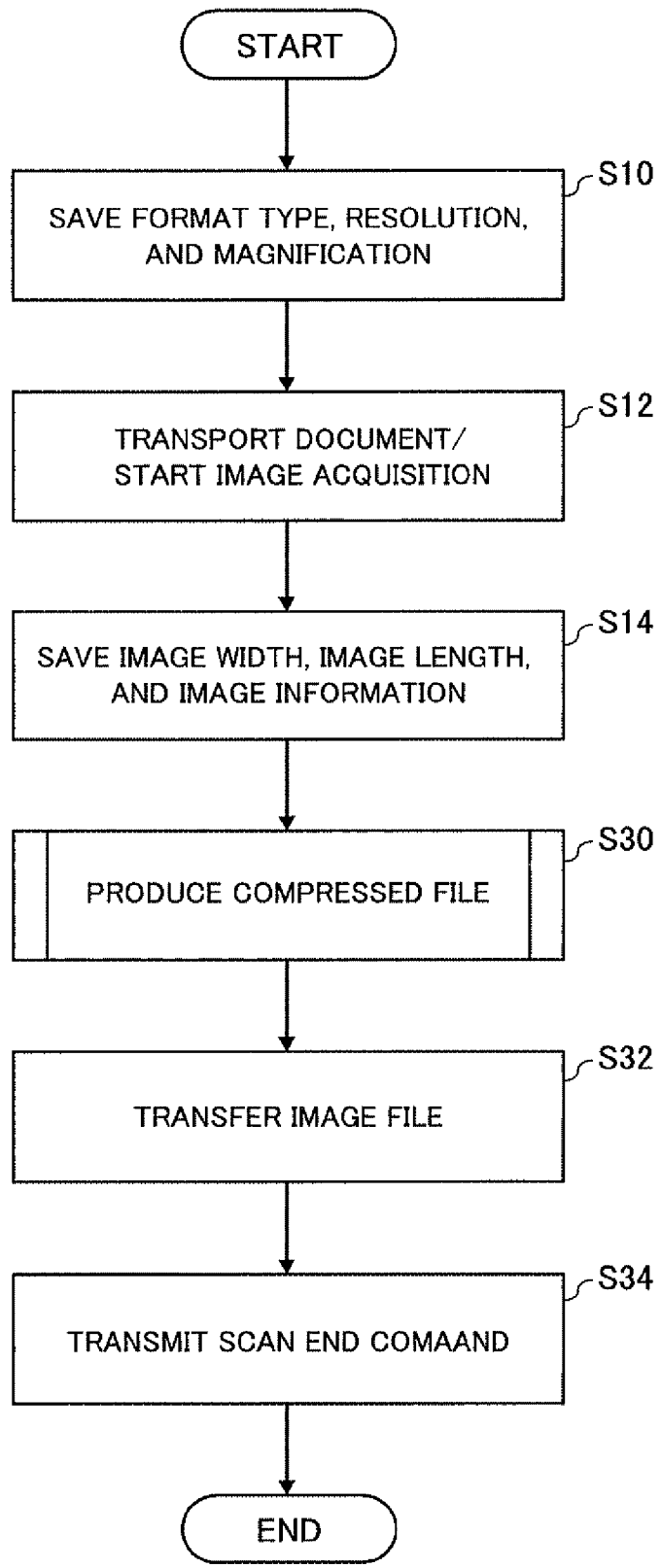
FIG. 13 is a first flowchart showing the operation of a document image acquisition part in the document reading device according to the exemplary embodiment of the present invention.

FIG. 13 shows the operation of the document reading unit 400 when receiving the scan demand command 602.

When the series of operation is started by receiving the scan demand command 602, at step S10, the document reading unit 400 saves the format for compressing an image, the resolution for scanning, and the magnification for scanning, based on parameters set with the scan demand command 702. At next step S12, the document reading unit 400 starts transporting a document with the document transport part 408 and obtaining the document transported with the document image acquisition part 424. At next step S14, the document reading unit 400 stores the image information, the image width, the image length, and the document length, which are respectively obtained at step S12, into the document image storage part 430.

At next step S30, the document reading unit 400 compresses the document image with the compression part 432. Note that the detail for compression of document image at step S16 will be described later.

At next step S32, the document reading unit 400 transfers the document image file compressed to the control unit 500.

At next step S34, the document reading unit 400 transmits the scan end command 626 to the control unit 500, and terminates series of processing.

Figure 14:
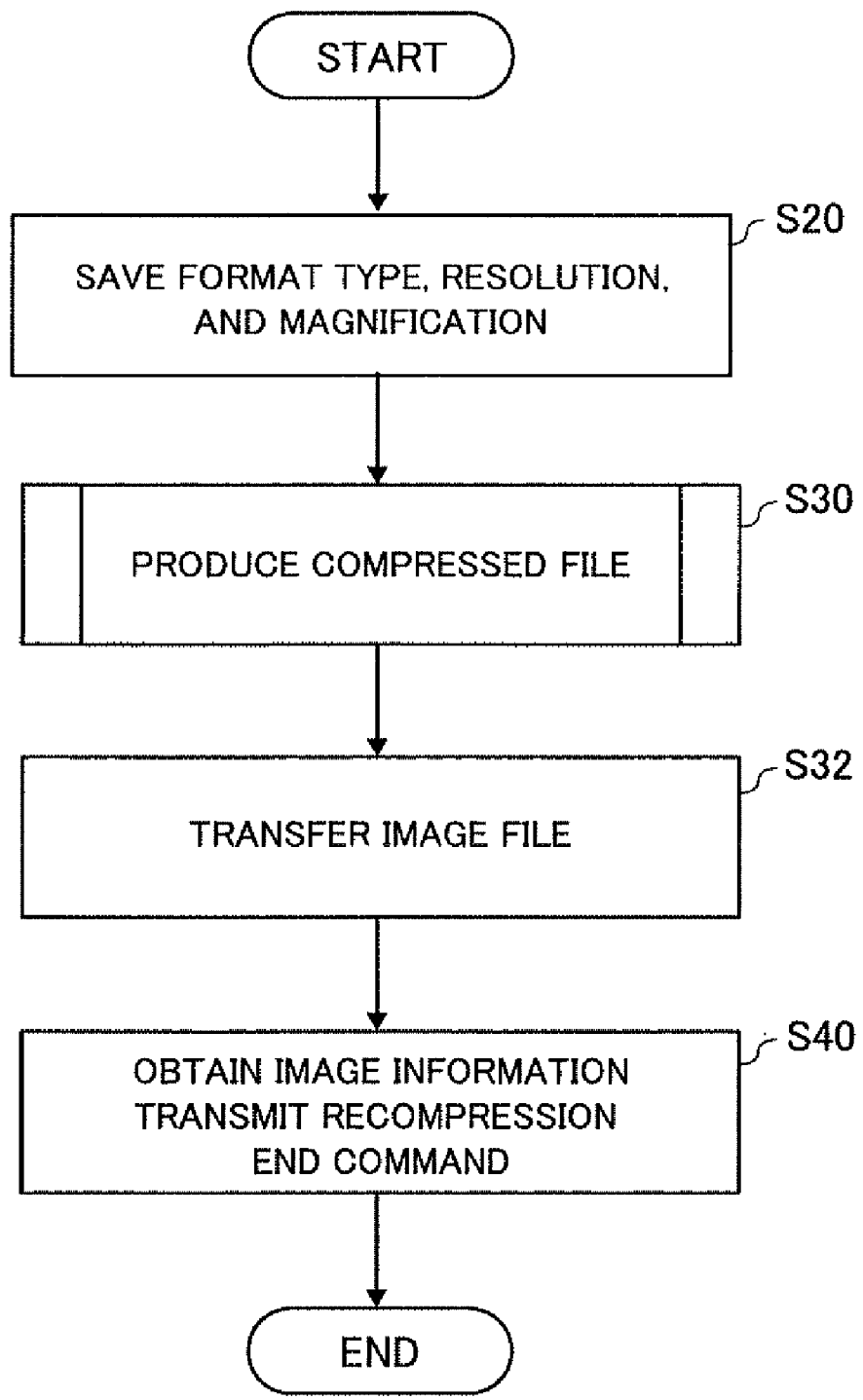
FIG. 14 is a second flowchart showing the operation of the document image acquisition part in the document reading device according to the exemplary embodiment of the present invention.

FIG. 14 shows the operation of the document reading unit 400 when receiving the recompression demand command 604.

When the series of processing is started by receiving the recompression demand command 604, at step S20, the document reading unit 400 saves the format for recompressing the image, the resolution for scanning, and the magnification for scanning, based on parameters set with the recompression command 604.

At next step S30, the document reading unit 400 compresses the document image, saved in the document image storage part 430 at step S14, with the compression part 432. Note that the detail for the compression of the document image at step S30 will be described later.

At next step S32, the document reading unit 400 transfers the document image file compressed to the control unit 500.

At next step S40, the document reading unit 400 transmits the recompression end command 628 to the control unit 500, and terminates series of processing.

Figure 15:
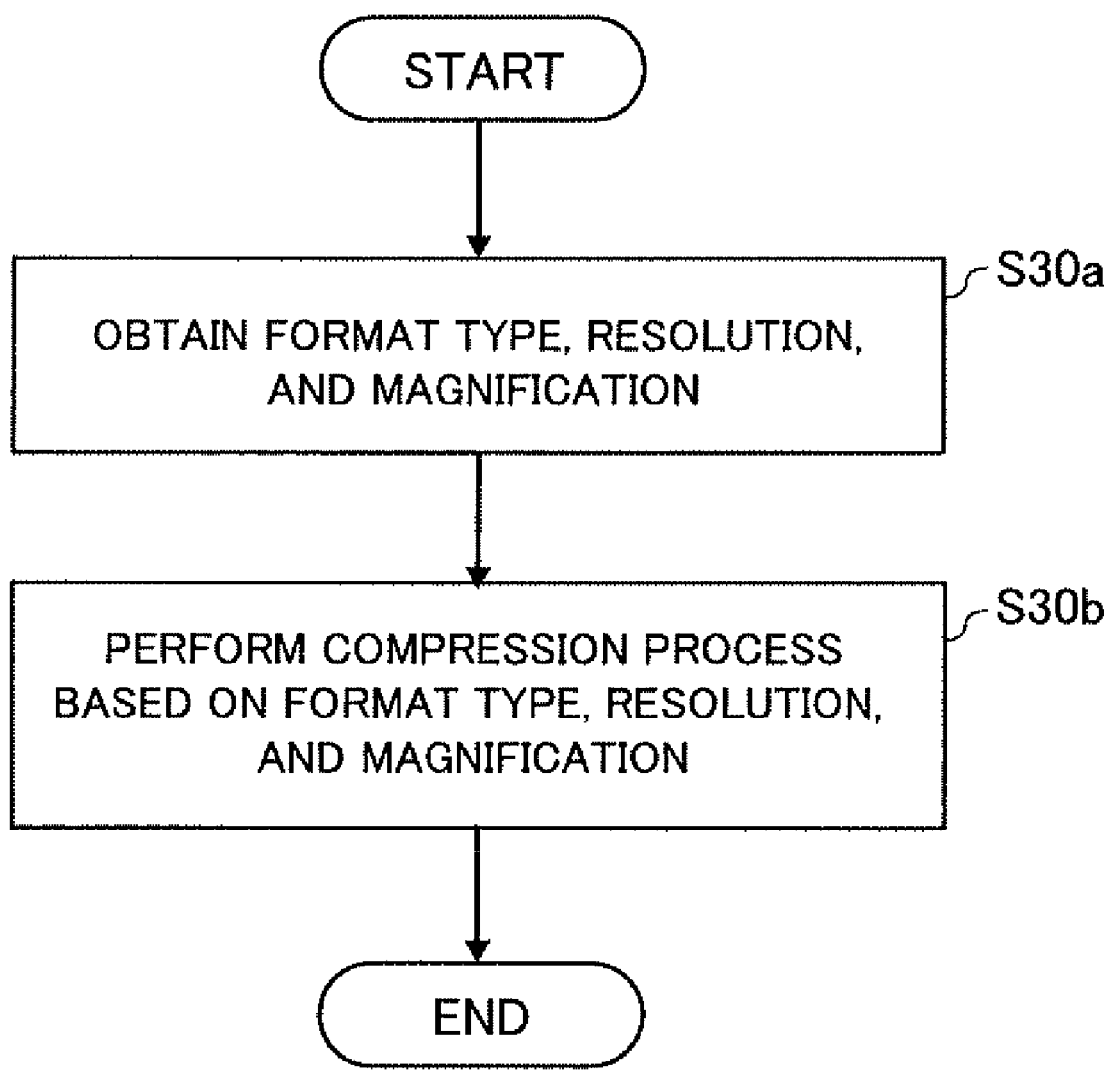
FIG. 15 is a third flowchart showing the operation of the document image acquisition part in the document reading device according to the exemplary embodiment of the present invention.

FIG. 15 shows the compression of the document image at step S30.

As shown in FIG. 15, the compression part 432, at step S30a, obtains the format for compressing an image, the resolution for scanning, and the magnification for scanning, and at step S30b, performs the compression processing according to the format, the resolution for scanning, and the magnification for scanning respectively obtained.

Figure 16:
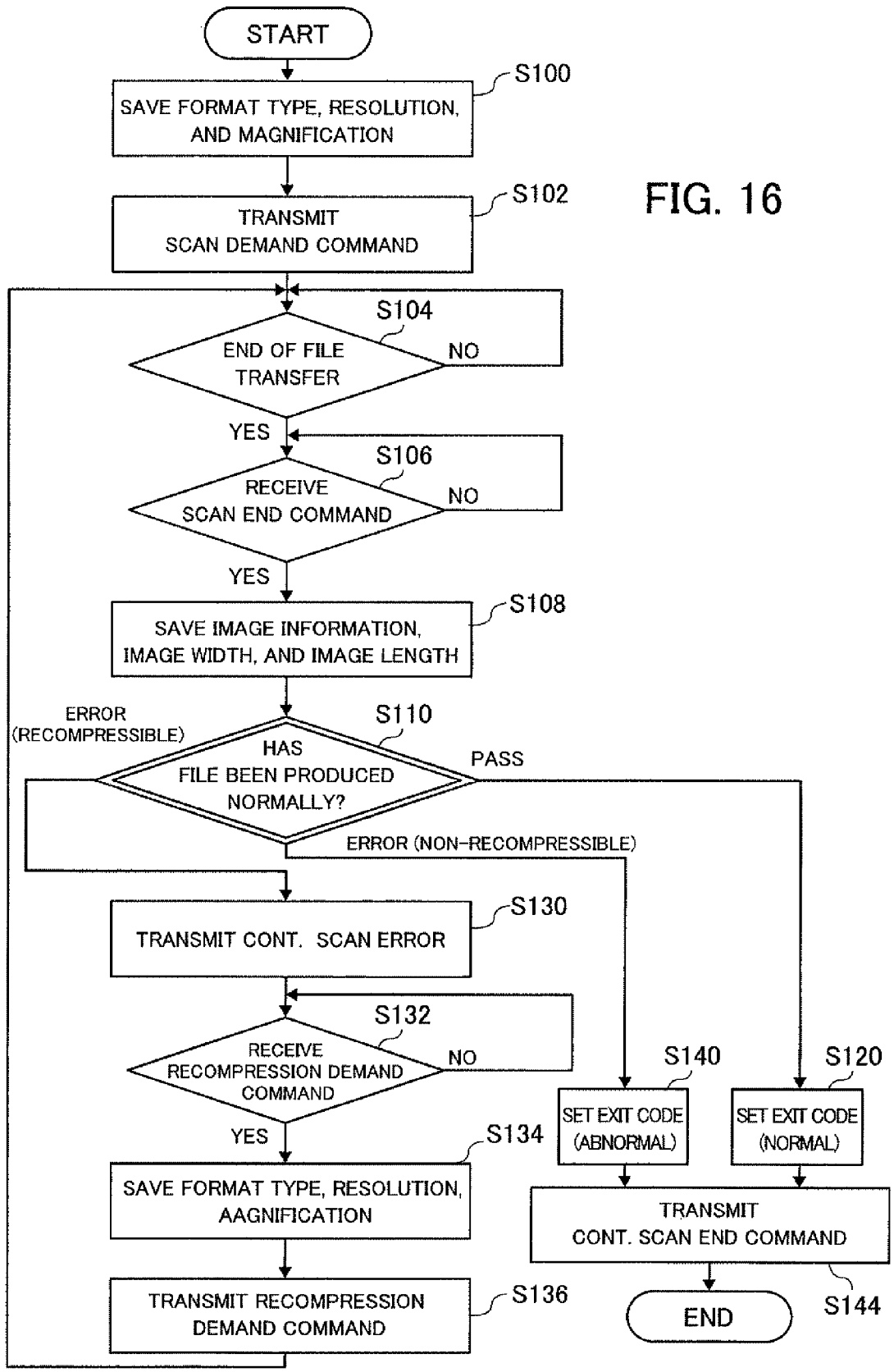
FIG. 16 is a flowchart showing the operation of a control part in the document reading device according to the exemplary embodiment of the present invention.

FIG. 16 shows the operation of the control unit 500 when receiving the scan demand command 702.

When the series of operation is started by receiving the scan demand command 702, at step S100, the control unit 500 saves the format for compressing an image, the resolution for scanning, and the magnification for scanning, based on parameters set with the scan demand command 702. Next, at step S102, the control unit 500 transmits the scan demand command 602 to the document reading unit 400.

At the next step S104, the control unit 500 confirms that the file has been transferred from the document reading unit 400. Further at the next step S106, the control unit 500 confirms a reception of the scan end command 626 from the document reading unit 400, subsequently, at next step 108, saving the image information, the image width, the image length, and document length, from the file transferred, into the image information storage part 504.

At the next step S110, the control unit 500 determines, based on the image information, the image width, and image length, respectively saved at step S108, whether or not the document file compressed has been normally produced. When it is determined that the document file compressed has been normally produced, the process proceeds to the next step S120. Alternatively, when it is determined that though the document image file compressed has not been normally produced, it is possible to normally produce the image file compressed by changing a setting (recompressible), the process proceeds to the next step S130. Alternatively, when it is determined that the document image file compressed has not been normally produced, and it is not possible to normally produce the image file compressed even if a setting for compressing the document data is changed, the process proceeding to the next step s140.

Note that the case where it is determined that the document image file compressed has not been normally produced, and it is not possible to normally produce the compressed image file even if a setting for compressing the document data is changed, includes a case where as a specification of the document reading unit 400, a readable document height is equal to or lower than 15000 millimeters, while the document height tried to read is higher than 15000 millimeters. Note that as the document length, the value indicated on the document length 634 of the scan end command 626 is used.

At step S120, the control unit 500 sets the exit code of the scan end command 740 to normal setting, the process proceeding to the next step S144. Also, at step S140, the control unit 500 sets the exit code of the scan end command 740 to abnormal setting, the process proceeding to the next step S144. At step S144, the control unit 500 transmits the scan end command 740 to the display operation unit 200, and terminates the series of processing.

Further, as the step S130, the control unit 500 transmits the scan error command 744.

At the next step to step S130, i.e. step S132, the control unit 500 confirms a reception of the recompression demand command from the display operation unit 200, and at the next step S134, saves the format for recompressing an image, the resolution for scanning, and the magnification for scanning based on the recompression demand command transmitted from the display operation unit 200. At the next step S136, the control unit 500 transmits the compression demand command 604 to the document reading unit 400, the process returning to the step S104.

The above-described embodiment is described in the case where the document image file compressed had not been produced normally in the image forming apparatus 10, in particular, as an example where it is not possible to normally produce the image file compressed even if a setting for compressing the document data is changed, described in the case where as a specification of the document reading unit 400, a readable document height is equal to or lower than 15000 millimeters, while the document height tried to read is higher than 15000 millimeters. Similar to the above-example, as a case where the document image file compressed has not been produced normally, other example, where the document image compressed has not been produced normally even if the setting is changed, includes an example where a storage capacity of the compressed image with the compression part 432 is beyond predefined capacity (e.g. over 2 GB).

Further, as described above, JPEG has a limitation that both of the image width and the image height are lower than 65535 dots. When the resolution for scanning is 600 dpi, 65535 dots of the limitation is equivalent to 2774 millimeters of the document width or the document height. Also, when the resolution for scanning is 400 dpi, 65535 dots of the limitation is equivalent to 4146 millimeters of the document width or the document height.

As described above, the present invention is applicable to a document reading device and an image forming apparatus such as a copier having the document reading device.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The exemplary embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A document reading device comprising:
a document image acquisition unit that scans a document and obtains a document image;
a document image storage unit that stores the document image obtained by the document image acquisition unit;
a compression unit that compresses the document image stored in the document image storage unit;
a determination unit that determines whether or not a document image file compressed by the compression unit has been normally produced; and
a setting change unit that, in the case where it is determined that the document image file compressed has not been produced normally, changes a setting so as to recompress the document image stored in the document image storage unit with another setting,
wherein the document image acquisition unit obtains an image width of the document image and/or an image length thereof, and the determination unit determines with the image width of the document image and/or the image length thereof whether or not the document image file compressed has been normally produced.

2. A document reading device comprising;
a document image acquisition unit that scans a document and obtains a document image;
a document image storage unit that stores the document image obtained by the document image acquisition unit;
a compression unit that compresses the document image stored in the document image storage unit;
a determination unit that determines whether or not a document image file compressed by the compression unit has been normally produced;
a setting change unit that, in the case where it is determined that the document image file compressed has not been produces normally, changes a setting so as to recompress the document image stored in the document image storage unit with another setting; and
a document length acquisition unit that detects a document length, wherein the determination unit determines with the document length whether or not the document image file compressed has been normally produced.

3. A document reading device comprising:
a document image acquisition unit that scans a document and obtains a document image;
a document image storage unit that stores the document image obtained by the document image acquisition unit;
a compression unit that compresses the document image stored in the document image storage unit;
a determination unit that determines whether or not a document image file compressed by the compression unit has been normally produced; and
a setting change unit that, in the case where it is determined that the document image file compressed has not been produced normally, changes a setting so as to recompress the document image stored in the document image storage unit with another setting,
wherein the determination unit further determines, in the case where it is determined that the document image file compressed has not been produced normally, whether or not it is capable of producing normally the document image file compressed by changing the setting; and when it is determined that it is not capable of producing normally the document image file compressed despite the change of the setting, the document image stored in the storage unit is deleted.

4. An image forming apparatus comprising:
a document reading device that reads a document; and
an image forming unit that forms an image based on an output from the document reading device,
the document reading device having:
a document image acquisition unit that scans a document and obtains a document image;
a document image storage unit that stores the document image obtained by the document image acquisition unit;
a compression unit that compresses the document image stored in the document image storage unit;
a determination unit that determines whether or not a document image file compressed by the compression unit has normally been produced; and
a setting change unit that, in the case where it is determined that the document image file compressed has not been produced normally, changes a setting so as to recompress the document image stored in the document image storage unit with another setting
wherein the document image acquisition unit obtains an image width of the document image and/or an image length thereof, and the determination unit determines with the image width of the document image and/or the image length thereof whether or not the document image file compressed has bean normally produced.

5. An image forming apparatus comprising:
a document reading device that reads a document; and
an image forming unit that forms an image based on an output from the document reading device,
the document reading device having:
a document image acquisition unit that scans a document and obtains a document image;
a document image storage unit that stores the document image obtained by the document image acquisition unit;
a compression unit that compresses the document image stored in the document image storage unit;
a determination unit that determines whether or not a document image file compressed by the compression unit has normally been produced;
a setting change unit that, in the case where it is determined that the document image file compressed has not been produced normally, changes a setting so as to recompress the document image stored in the document image storage unit with another setting; and
a document length acquisition unit that detects a document length, wherein the determination unit determines with the document length whether or not the document image file compressed has been normally produced.

6. An image forming apparatus comprising:
a document reading device that reads a document; and
an image forming unit that forms an image based on an output from the document reading device, the document reading device having:

a document image acquisition unit that scans a document and obtains a document image;

a document image storage unit that stores the document image obtained by the document image acquisition unit;

a compression unit that compresses the document image stored in the document image storage unit;

a determination unit that determines whether or not a document image file compressed by the compression unit has normally been produced;

a setting change unit that, in the case where it is determined that the document image file compressed has not been produced normally, changes a setting so as to recompress the document image stored in the document image storage unit with another setting;

wherein the determination unit further determines, in the case where it is determined that the document image file compressed has not been produced normally, whether or not it is capable of producing normally the document image file compressed by changing the setting; and when it is determined that it is not capable of producing normally the document image file compressed despite the change of the setting, the document image stored in the storage unit is deleted.

* * * * *